United States Patent [19]

Izzo et al.

[11] Patent Number: 4,882,187

[45] Date of Patent: Nov. 21, 1989

[54] EDIBLE SPREAD AND PROCESS FOR THE PREPARATION THEREOF

[75] Inventors: Henry J. Izzo, Bridgewater; Stephen M. Pincus, Marlboro; Jane B. Theiler, Harrington Park; Michael C. Cirigliano, Bergenfield, all of N.J.

[73] Assignee: Thomas J. Lipton Inc., Englewood Cliffs, N.J.

[21] Appl. No.: 69,058

[22] Filed: Jul. 2, 1987

[51] Int. Cl.$^4$ .............................................. A23D 3/00
[52] U.S. Cl. .................................. 426/335; 426/532; 426/573; 426/602; 426/603; 426/663; 426/804
[58] Field of Search .............. 426/573, 603, 804, 613, 426/604, 602, 663, 532, 335, 581, 321

[56] References Cited

U.S. PATENT DOCUMENTS

| | | | |
|---|---|---|---|
| 1,024,009 | 4/1912 | Kronenberger | 426/603 |
| 4,103,037 | 7/1978 | Bodor et al. | 426/575 |
| 4,389,426 | 6/1983 | Reissmann et al. | 426/603 |
| 4,520,037 | 5/1985 | Gould et al. | 426/330.6 |
| 4,555,411 | 11/1985 | Moran et al. | 426/603 |

FOREIGN PATENT DOCUMENTS

| | | |
|---|---|---|
| 0011891 | 6/1980 | European Pat. Off. |
| 0199397 | 10/1986 | European Pat. Off. |
| 1094268 | 12/1967 | United Kingdom |
| 1450269 | 9/1976 | United Kingdom |
| 2021140A | 11/1979 | United Kingdom |

OTHER PUBLICATIONS

Knox Sparkling Gelatine Receipes, The Charles B. Knox Gelatin Company, Inc., Johnstown, NY.

*Primary Examiner*—Donald E. Czaja
*Assistant Examiner*—Celine T. Callahan
*Attorney, Agent, or Firm*—Brumbaugh, Graves, Donohue & Raymond

[57] ABSTRACT

Process for preparing an edible spread of fat content lower than butter or margarine including the steps of forming an admixture of plastic dispersion (A) having a continuous fat phase and a discontinuous aqueous phase, which aqueous phase has a pH above 4.7 and contains protein selected from the group consisting of milk protein, soy protein and mixtures thereof, and an aqueous composition (B) having a pH at or below 4.7 and containing hydrocolloid, the aqueous composition (B) being substantially free of milk protein and soy protein, and subjecting the admixture of (A) and (B) to a working treatment at a temperature at which (A) remains plastic. The spread so obtained has a continuous fat phase and two distinct aqueous phases, one having the characteristics of the aqueous phase of (A), the other the characteristics of (B).

61 Claims, 1 Drawing Sheet

FIG.1

EDIBLE SPREAD AND PROCESS FOR THE PREPARATION THEREOF

BACKGROUND OF THE INVENTION

The present invention relates to an edible spread having a continuous fat phase and to a process for the preparation thereof.

Examples of an edible spread are butter and margarine. Such products contain a discontinuous aqueous phase in an amount usually of about 15-20% by weight. Similar spreads, but containing a higher amount of discontinuous aqueous phase, for example of 60% by weight or even more, are commonly referred to as for example low calorie spread or low fat spread.

It becomes increasingly difficult to prepare a high quality product as the amount of discontinuous aqueous phase to be included is higher.

As the water content increases it becomes more difficult to obtain the required physical stability. To prevent coalescence of dispersed water droplets from occurring and obtain a stable product, GB No. 1,094,268 suggests incorporation of a thickening agent in the aqueous phase and an emulsifier in the fat phase.

The high water content, however, gives rise not only to a physical stability problem, but also tends to make the product taste watery. For this reason, and, inter alia, to improve the flavor release, milk proteins are often included. However, the presence of milk protein makes it more difficult to obtain a plastic dispersion that is both physically and microbiologically stable. Often a hydrocolloid is included to improve the physical stability. To prevent microbiological deterioration it has been suggested to include preservatives and to lower the pH. However, high concentrations of preservatives are often disliked by consumers, and high amounts of acid can adversely affect the taste of the product.

GB No. 1,450,269 is concerned with low calorie spreads, in particular spreads of which the fat portion comprises a substantial amount of butterfat. It is advised to include in the aqueous phase, milk protein and hydrocolloid. The patent discloses that for microbiological stability reasons, the pH of the aqueous phase should be less than 6.0, but on the other hand, for organoleptic reasons should not be below 4.5, preferably not below 4.8. The specification advises, in order to physically stabilize the low fat spread to employ hydrocolloid that can keep proteins soluble; mixtures of pectin and carrageenan are preferred. To obtain a stable product, partial glycerides must be included as emulsifier.

GB No. 1,450,269 discloses a process for preparing a low fat spread wherein butter is heated to 80° C., cooled to 35° C. and mixed with an aqueous composition containing milk protein, hydrocolloid, salt and partial glycerides at 35° C. The pH is adjusted to, for instance, 5.15-5.3 and the admixture is passed through a series of scraped surface heat exchangers of the Votator A-unit type.

U.S. Pat. No. 4,103,037 also addresses the problem that the high water content of reduced fat spreads adversely affects organoleptic properties and/or the stability of such products, compared with butter or margarine and that the incorporation of protein in such products causes destabilization, both physically and microbiologically. According to the specification, gelling agent having a slip melting point of 25°-35° C., e.g. gelatin or Danish agar, and non-gelling protein, e.g. milk protein, should be included in the aqueous phase composition in a specified ratio, under conditions such that formation of undissolved protein particles of a major dimension of more than 5 microns is avoided. It is advised to include, as emulsifier, monoglycerides and, for bacteriological reasons, to adjust the pH to, preferably, 4.6-5.8. To prevent the protein from flocculating which, it is said, may easily occur at the lower pH values, it is advised to first prepare separate solutions of gelling agent and protein, the solution of gelling agent being substantially protein-free and having a pH of 1-7, and the solution of protein being substantially neutral, including in the protein solution a deflocculation agent, e.g. xanthan gum, locust bean gum or sodium CMC, then combining the solution of gelling agent and the substantially neutral proteinaceous solution containing the deflocculation agent, and subsequently adjusting the pH to the desired value.

U.S. Pat. No. 4,389,426 discloses that the organoleptic properties of low-fat spreads are often poor, owing to the high water content, and that often proteins are incorporated in the aqueous phase to improve this. To counteract the destabilizing effect of milk protein, gelling agents are incorporated in the aqueous phase. The mechanism of the counteraction is assumed to involve encapsulating or complexing of the protein with the gelling agent, binding of the water of the aqueous phase and increasing its viscosity.

The specification advocates to use as gelling agent, instead of the expensive gelatine, a combination of a colloid that forms a linear gel structure and a colloid capable of forming a spherical gel structure. For bacteriological reasons it is recommended that the pH should preferably be in the range from 4.6 to 5.8.

EP No. 0,011,891 mentions that it has been suggested to thicken the dispersed aqueous phase of spreads with, for example, fats, thickening agents like gums or proteins, and that in such products, frequently problems of diminished organoleptic qualities, insufficient microbiological keeping qualities and/or insufficient emulsion stability were observed. The specification teaches that in particular low fat spreads, which, it is said, frequently have too watery a taste, can be improved by incorporating in the continuous plastic fat phase a discontinuous aqueous phase consisting of non-gelled, liquid, finely dispersed droplets having a size range from 1 to 5 microns and a further discontinuous aqueous phase consisting of coarse, gelled droplets having a diameter in the range from 10 to 20 microns. Either or both of the discontinuous aqueous phases may comprise protein, in particular milk protein. It is advised to include emulsifier, e.g. phosphatides and/or partial glycerides.

The products obtained according to the above mentioned patents are not optimal. They present various compromises between the desired properties regarding physical stability, organoleptic characteristics and microbiological keepability. Compared with butter or premium margarine, the quality of the low fat spreads tends to be lower with respect to at least one of these properties, and usually with respect to two or three of them.

U.S. Pat. No. 4,520,037 aims to improve the microbiological stability of low fat spreads. The proposed product is a fat-continuous emulsion which comprises at least two distinct discontinuous aqueous phases each of which should comprise a microbiologically labile nutrient such as milk protein, vegetable protein, glucose, lactose or partially hydrolyzed starch. Furthermore, an effective amount of one or more ingredients that inhibit bacterial growth, e.g. acids, salts or preservatives, should be concentrated in each of the two aqueous phases. The product may contain more than two distinct dispersed aqueous phases, which additional aqueous phases may also contain nutrients. Any nutrients present, however, should be protected, either by an bacterial growth inhibiting ingredient as described above or by ensuring that the size of the aqueous phase droplets that contain the nutrient is less than 5 microns or even less than 2 microns.

In order to be able to prepare a stable product and to prevent intermingling and coalescence of the differently formulated aqueous phase drops from occurring, it is advised to include an emulsifier. A strong preference is expressed for emulsifiers of the polyglycerol fatty acid ester type.

A number of documents ha been published that describe the preparation of spreads using butter as starting material.

U.S. Pat. No. 4,555,411 aims to facilitate the preparation of fat-continuous low fat spreads. It teaches how to prepare such spreads by forming an emulsion and shearing and cooling it, using apparatus that is coated with or produced from hydrophobic material. The use of for example votator equipment coated with hydrophobic material causes phase inversion of for example dairy cream to occur more easily. Thus, according to the specification, low calorie butter can be prepared by phase inverting dairy cream without having to use non-dairy emulsifiers.

It is described how such a product can be prepared from a composition of melted butter, mixed with inter alia gelatin and skim milk. The water-continuous emulsion is turned into a fat-continuous low calorie butter by rapid cooling and inverting the cream by means of an A-unit and a crystallizer unit in which very high shear is applied, both of which units have been provided with a hydrophobic coating by filling them, beforehand, with fat.

U.S. Pat. No. 1,024,009, for example, describes a butter substitute made by combining milk, gelatin and butter and by emulsifying the mixture to obtain a homogeneous plastic mass. The gelatin is stated to be an emulsifying agent, and is used at a level of one heaping teaspoonful in one pint of whole milk. After combining the ingredients, the mixture is heated to melt the butter, and the mixture then cooled with agitation.

In addition, for many years the Knox Gelatin Company has distributed a recipe book which includes a recipe for stretching butter in which plain unflavored gelatin is softened in cold water, dissolved thoroughly over hot water, mixed with either fresh or evaporated milk, and the solution then whipped into softened but unmelted butter with an electric mixer until a stable mixture is formed. The mixture is then placed in a refrigerator until firm.

UK Patent Application GB No. 2,021,140 A published Nov. 28, 1979 describes a dairy blend comprising a homogeneous mixture of butter and a vegetable oil and having mixed therewith an aqueous gelatin solution. The product is made by softening butter to a temperature of 30° C. to 35° C. without over-softening, mixing with the softened butter a partially gelled solution of gelatin and emulsifying agent, allowing the mixture to stand, and thereafter adding the vegetable oil with continuous mixing. The solution of gelatin and emulsifier may further contain milk protein and, for example, salt. Without the addition of the vegetable oil, the product is said not to be spreadable straight out of the refrigerator.

The reduced fat spreads prepared according to these procedures using butter as starting material have distinct disadvantages. In particular, the storage properties are unsatisfactory. For example, the product made following the Knox Gelatin recipe will keep only about a week in a refrigerator.

STATEMENT OF THE INVENTION

We have now found that spreads, and in particular spreads with a fat content lower than butter or margarine, can be obtained that have good storage properties, both physically and microbiologically, and that have favorable organoleptic properties.

According to a first aspect, the present invention provides a process for preparing an edible spread having a continuous fat phase including the steps of
 (i) forming an admixture of
   an edible plastic dispersion (A) comprising a continuous fat phase and a discontinuous aqueous phase, which aqueous phase has a pH higher than 4.7 and contains protein selected from the group consisting of milk protein, soy protein and mixtures thereof, and
   an edible aqueous composition (B) having a pH at or below 4.7, preferably from 2.5 to 4.7 and containing hydrocolloid, which aqueous composition is substantially free from milk protein and soy protein,
 (ii) forming a product having a continuous fat phase by subjecting the admixture to a working treatment at a temperature at which the fat phase of plastic dispersion (A) remains plastic, and
 (iii) packing the product.

We have found that the product so prepared does not taste sour despite the low pH of the aqueous composition (B). We have further found that in this way physically stable spreads can be prepared without the need to use high amounts of added emulsifiers. As will be described in more detail below, in certain cases the incorporation of such emulsifiers can be dispensed with entirely. The use of substantial amounts of such emulsifiers is undesirable because they adversely affect the organoleptic properties. They slow down the breakdown of the dispersion in the mouth and thereby have a negative influence on the flavor release. Moreover, the commonly used emulsifiers have an unpleasant flavor which is noticeable in products containing substantial amounts of such emulsifiers. We have furthermore found that with this process, the microbiological keepability of the product is improved. As will be described in more detail below, it is preferred to include preservatives; however, very good microbiological stability is obtained within a relatively low amount of any such preservative incorporated. Thus, low fat spreads with a shelf life substantially similar to that of butter or margarine can be prepared using only minimal amounts of preservative.

We have also found that the products so obtained evidence a level of butter flavor that is nearly indistinguishable from normal butter. It has been the experience of those skilled in the art that products designed to extend butter demonstrate a reduction in butter flavor because of the dilution effect. Most low fat products already on the market remedy this defect by adding artificial flavor to make the product more nearly equivalent to normal butter in flavor type and level.

According to a second aspect the present invention provides an edible spread having the advantageous properties described above, which spread has a continuous fat phase and contains

- a discontinuous aqueous phase (a) having a pH higher than 4.7 and containing protein selected from the group consisting of milk protein, soy protein and mixtures thereof, and
- an aqueous phase (b) having a pH at or below 4.7 preferably from 3.0 to 4.7 and containing hydrocolloid, which aqueous phase (b) is substantially free from milk protein and soy protein.

Further, in accordance with a preferred embodiment, the droplets of discontinuous aqueous phase (a) of plastic dispersion (A) have a volume weighted mean diameter that is less than 15 microns, more preferably in the range of 0.1 to 10 microns, and most preferably, in the range of 1 to 5 microns. Aqueous phase (b) may be present as a continuous phase, in which case the product can be describes as bicontinuous, or it may be present as a discontinuous phase. In the latter case, preferably the droplets of discontinuous aqueous phase (b) found by dispersing the aqueous composition (B) have a volume weighted mean diameter that is less than 40 microns, and more preferably in the range of 1–30 microns.

Such spreads can be prepared using the process according to the present invention described above.

DESCRIPTION OF THE INVENTION

The present product can be prepared according to an embodiment of the present process, wherein the admixture formed in step (i) is a dispersion having a continuous fat phase. This can, for example, be achieved by forming the admixture with the use of equipment that, effectively, mixes the aqueous composition (B) into dispersion (A) rather than the other way around.

Structurally, products according to the present invention, thus prepared, will usually be composed predominantly of a continuous fat phase and two distinct discontinuous aqueous phases. The continuous fat phase will comprise both liquid oil and solid fat. It will include substantially all fat contained in the product. One of the discontinuous aqueous phases will be composed of droplets having a composition that will be essentially similar to that of the aqueous composition (B) that was employed in the process, whereas the other aqueous phase will essentially consist of the discontinuous aqueous phase of the plastic dispersion (A) that was used.

In the preferred embodiment utilizing butter, one of the effects of having the two separate phases in the products made according to this invention is that it contains in undiluted form the normal aqueous butter phase and it is then present in the mouth, on eating the product, to provide the full impact of a complete butter flavor. Because there is no molecular dilution, it is thus possible to extend the spread by adding a non-fat aqueous phase while still retaining the potential flavor impact provided by the undiluted butter serum. This makes possible the realization of a high quality flavor product without the necessity of adding artificial flavors.

According to a preferred embodiment in step (i) of the present process an admixture having a water continuous phase is formed. This can be done by dispersing plastic dispersion (A) in aqueous composition (B), for example with the use of a static mixer. The admixture then essentially has a water-in-oil-in-water (w/o/w) structure.

In step (ii) a product having a continuous fat phase is then formed by imparting sufficient energy to the admixture, while ensuring that it continues to contain a not unsubstantial amount of solid fat, for example at least about 2% calculated on the weight of the total composition. Preferably the continuous fat phase is, thus, brought about by working the admixture, in particular by passing it through a high shear mixer.

Structurally, structurally rather complex products can be obtained. For example, dispersed within the continuous fat phase there may be regions comprising aqueous phase, having for example a composition similar to that of the aqueous phase composition (B), which regions, in turn, contain dispersed therein small oil globules or even parts of water-in-oil structure, originating from plastic dispersion (A). Thus, the resulting structure may be o/w/o, or even w/o/w/o. The structure of the product may also be a combination of such structure. It may for example be predominantly a w/o structure, but which has some o/w/o character.

Furthermore, there need not be a complete phase inversion. By causing only a partial inversion to occur, a bi-continuous product having both a continuous fat phase and a continuous aqueous phase, the latter being a composition similar to aqueous composition (B), can be obtained.

The product may furthermore contain dispersed therein, some aqueous droplets comprising ingredients originating from both aqueous composition (B) and from the aqueous phase of plastic dispersion (A). Such intermixing of aqueous phases is however not preferred, nor is it likely to happen in the present process to any considerable extent. To prevent such intermixing from happening to a significant extent, however, we believe it to be necessary that step (ii) of the process is carried out such that the butter fat continues to be plastic. One might have expected that, to prepare a product with distinct aqueous phases, it is necessary to treat the composition, from the stage that it contains the two aqueous phases, very carefully and, in particular, that no high shear should be applied. Such belief is expressed, for example, in U.S. Pat. No. 4,520,037: the two cooled, texturized emulsions are carefully mixed, using a static mixer. We have found, however, that in the present process, for example when using butter as plastic dispersion (A), very high shear may be applied without losing the advantages of the distinct aqueous phases.

According to a preferred embodiment of the present process, butter is used as plastic dispersion (A). Particularly advantageous results can be obtained by using butter as plastic dispersion (A), forming an admixture having a water-continuousphase in step (i) and causing the admixture to form an oil continuous dispersion in step (ii) of the process. The dispersion formation can suitably be brought about by passage through a high shear mixer. A product with excellent butterlike properties can thus be obtained.

We have found that a product with good butterlikeness can be obtained despite the fact that high shear conditions are applied. One would have thought that when using butter as a starting material in order to maintain the butterlikeness, the butter should be handled carefully, and in particular no high shear should be applied. Such belief is, for example, expressed in EP No. 0,199,397 wherein it is advised to employ a special type, relatively low shear mixer, a so-called cavity transfer mixer, to mix for example butter and margarine, to prepare "melange" with butterlike properties. However, we have found that in the present process high shear such as for example occurs in a normally operated A-unit or even higher, may be applied without losing the butterlike properties.

It is to be understood, however, that it is not a necessity to employ high shear in the present process. For example, if in step (i) an admixture is formed that has a continuous fat phase, it may be appropriate to employ in step (ii) a relatively low shear mixer to effect the working treatment, for example a slowly rotating C-unit, a static mixer or a cavity transfer mixer as described in EP No. 0,199,397 cited above. The use of relatively low shear may in particular be suitable in case plastic dispersion (A) is relatively soft and/or if it contains a relatively coarse discontinuous aqueous phase, as occurs often in, for example, spreads with a reduced fat content.

As plastic dispersion (A) a variety of products may be employed. For example, common margarine or butter or a spread with a higher or a lower fat content may be employed. Especially beneficial results are obtained with the use of products such as margarine and, particularly, butter. The dispersion used as dispersion (A) may have been prepared beforehand and stored for some time. If appropriate it can be softened by heating before use in the present process. Alternatively, a freshly prepared dispersion can be employed. Immediately after production plastic dispersions of the present type are soft, because they are often, depending on the process employed, in an undercooled state, i.e. crystallization and formation of solid fat has not yet completed.

The spreads according to this invention may vary in fat content and products having as little as 26% fat have been prepared with the assistance of emulsifiers. A preferred range is 30-65% fat. The fat content is varied in accordance with the fat content of plastic dispersion (A), as well as the amount of plastic dispersion (A) employed in proportion to aqueous composition (B). The plastic dispersion (A) may contain from 40-95% by weight of fat, more preferably from 70-90% by weight.

Suitable spreads have been prepared according to this invention by forming admixtures comprising 30-80% by weight of edible plastic dispersion (A) and 70-20% by weight of aqueous composition (B). It is preferred to form admixtures comprising 40-60% by weight of edible plastic dispersion (A) and 60-40% by weight of aqueous composition (B).

It is also preferred that when forming admixtures of dispersion (A) and aqueous composition (B), as well as in subsequent processing steps (ii) and (iii), that temperature of the admixture and dispersion be maintained below 85° F. It is further preferred that the temperatures be maintained during processing to insure that the final product have a temperature of 45° F. to 80° F. on completion thereof.

To prepare spreads of optimal quality we have found it to be necessary to subject the admixture of edible plastic dispersion (A) and aqueous composition (B) to a working treatment to form the product having a continuous fat phase under conditions such that the fat phase of plastic dispersion (A) remains plastic.

We have found for example that according to our process an excellent product can be prepared using freshly churned butter as edible plastic dispersion (A) and an aqueous gelatin solution acidified to pH 4 and further containing only salt and, as preservatives, benzoate and sorbate. If, however, during the working treatment the temperature was allowed to rise for a sufficiently long time so that the fat was no longer plastic and all crystallized fat had essentially melted, a proper product could no longer readily be obtained by continuing working the admixture while cooling it to cause recrystallization of fat.

Since melting of fat does not occur instantaneously relatively high temperatures can be tolerated during short periods of time during the working treatment, but in order not to put the quality of the resulting product at risk, it is preferred to control the temperature of the admixture throughout the entire working treatment of step (ii) so that the fat will remain plastic even if kept at that temperature for prolonged periods of time, e.g. for 10 minutes or so. The fat phase is considered to be plastic as long as it contains a not insignificant amount of solid fat, e.g. at least about 2% calculated on the total weight of the admixture. Preferably the temperature during the working treatment of step (ii) is controlled so that the admixture contains at least 4% by weight of crystallized fat. The amount of solid fat present can suitably be determined by means of NMR, See: Fette, Seifen, Anstrichmittel 80 (1980), 180–186. In this specification no distinction is made between solid fat and crystallized fat. Although strictly speaking not all solid fat is necessarily present in the crystalline state, in the context of the present application such distinction is not relevant. The relevant quantity is the amount of solid fat. For convenience sake it is assumed that all solid fat is present in the forms of crystals, and the terms are used interchangeably. Throughout this specification the terms oil and fat are used interchangeably.

The term hydrocolloid is used to indicate gelling and thickening agents as described in Zeitschrift für Lebensmitteltechnologie und Verfahrenstechnik 32 (1981)6, pp. 253–256, and includes gelatin and polysaccharides such as native and modified starches, cellulose derivatives, and natural hydrocolloids such as carrageenan, Danish agar, agar, pectin, algin, alginates, gum arabic and the products of fermentation, such as xanthan gum and gellan gum.

The term milk protein is used in its common meaning and indicates proteins in denatured or undenatured form as are present in milk or derived therefrom. It includes the proteins provided by milk, skim milk, buttermilk, and the like, whether as such or in concentrated or powdered form, and fractions and modified forms thereof, such as acid casein, caseinates and whey proteins. Similarly, by soy protein is meant the protein obtained from soy bean and fractions thereof, whether in natural or denatured form.

The volume weighted mean diameter and the number weighted mean diameter of the aqueous droplets in the product, the so-called D(3,3) and D(0,0) values, respectively, can suitably be estimated by means of NMR [see J. Colloid and Interface Science (1972), 40(2), 206–218 and (1983), 93(2), 521–529] using a log-normal distribution as is commonly employed for particle size analysis. The properties of the product depend more strongly on the larger aqueous phase droplets than on the smaller ones. Therefore, the volume weighted mean diameter of the aqueous droplets is a more relevant property than the number weighted mean diameter. Alternatively, the volume weighted mean diameter can be calculated using a microscopic picture of the product. Since the volume weighted mean diameter is predominantly determined by the bigger droplets, as a first estimate of the volume weighted mean diameter, which in practice is usually sufficiently accurate, the approximate diameter of the bigger droplets dominating the microscopic picture, but excluding a rare very big droplet, can be used.

It has been found in the case of our preferred products made using freshly churned butter as plastic dispersion (A) and an aqueous gelatin solution (b) acidified to pH 4 and further containing only salt, and sodium benzoate and potassium sorbate as preservatives, that products of excellent stability characteristics, both physical and microbiologically, and having excellent taste and eating qualities very similar to butter, are provided when the droplets of discontinuous aqueous phase (a) of plastic dispersion (A) have a volume weighted mean diameter that is less than 15 microns, more preferably in the range of 0.1 to 10 microns and most preferably in the range of 1 to 5 microns. At the same time, "droplets" of aqueous phase (b) formed by dispersing the aqueous composition (B) are larger. If aqueous phase (b) is a discontinuous picate, then preferably, it was a volume weighted mean diameter that is less than 40 microns and more preferably in the range of 1-30 microns.

It has further been found, in the case of our preferred products, than when preparing them, it is preferred that the temperature of the butter be 60°-65° F. and that the temperature of the gelatin solution be 90°-100° F. at the time they are combined, giving an admixture having a temperature in the range of 60°-80° F. Gelatin solution temperature as high as 120° F. have been used with success. While fluid solutions of gelatin as low as 75° F. have been used, it is important to note that once the gelatin solution has gelled, the resulting product is grainy and has poor organoleptic qualities. In addition, butter temperature in the range of 45°-75° F. have been successfully used.

We do not wish to be bound by theory but we believe that the advantageous properties of the present product are due to the combined action of an aqueous phase with low pH that is free from in particular milk protein, and a discontinuous aqueous phase with higher pH that does contain such protein. It is thought that the protein in aqueous phase (a) promotes the rapid destabilization and flavor release of the product in the mouth. Despite the low pH of the aqueous phase (b), the amount of acid contained therein is relatively small. When the dispersion breaks down and the acid is released from aqueous phase (b) it is rapidly neutralized by the protein. In addition, because no milk protein is present in aqueous phase (b), only a small amount of acid is needed to provide the desired low pH. In any event, no sour taste is perceived. During storage, however, a substantial proportion of the aqueous phase of the product has a low pH, which is unfavorable medium for bacteriological growth. Moreover, preservatives such as benzoate and sorbate are optimally active at low pH, so that even at low concentrations these preservatives can be highly effective. If, however, aqueous phase (b) would contain milk protein, it would already neutralize the acid before the product destabilizes in the mouth and thereby raise the pH. Then aqueous phase (b) would provide a better medium for bacterial growth and, moreover, any preservatives contained therein would be less effective. If, alternatively, the neutralizing action of milk protein in aqueous phase (b) would be compensated by employing more acid to maintain the low pH, then the amount of acid would be so large that the product would taste sour. Accordingly, aqueous phase (b) of the present spread and aqueous composition (B) of the present process should preferably not contain ingredients with a high buffer capacity.

Conventional additives to edible spreads may be used in the spreads of this invention. For example, beta conotene or annatto can be added to a small amount of fat and dispersed throughout the oil phase to provide a uniform desired color to the product.

Aqueous phase (b) and aqueous composition (B) may contain ingredients in addition to those specifically mentioned herein, but preferably the overall compositions of aqueous phase (b) and aqueous composition (B) are such that the overall result is a mixture having a low buffer capacity. For example, Batch 4 in Table I below 5.4 m moles of HCl is required to lower the pH of 200 gm of an aqueous solution of 1.55% gelatin in deionized water, with 1% salt and 0.23% preservative by 1 pH unit. On the other hand, where aqueous phase (b) consists of 200 gm of a solution of skim milk containing 1% salt and 0.23% of the same preservative, 18 m moles of HCl is required to lower the pH by 1 pH unit. This represents a significantly higher buffer capacity.

In the present process, aqueous phase having a pH higher than 4.7 and containing for example milk protein, is included in plastic dispersion (A), which has a relatively high fat content compared with the end product. For example margarine, or particularly butter, may be used as dispersion (A). The aqueous phase contained in dispersions with a relatively high fat content such as butter and margarine, usually gives less of a problem with microbiological deterioration than does the aqueous phase contained in low fat spreads. Very good results are obtained with the present process, in particular also when used for making products with a very low fat content because, we believe, the protein containing aqueous phase having a relatively high pH is contained in the end product in substantially the same way as it is contained in the higher fat product dispersion (A). Since aqueous composition (B) does not contain milk protein or the like and has a low pH, and therefore, does not itself give rise to rapid bacterial growth, when using for example butter as dispersion (A), accordingly a lower fat end product can be obtained that has substantially similar microbiological storage properties as the butter used as dispersion (A). For these reasons also, we believe the product can have good microbiological stability even if aqueous phase (B) is a continuous phase.

As mentioned above, an excellent product was obtained with the use of freshly churned butter as edible dispersion (A) and an aqueous gelatin solution having pH 4 and containing salt and preservatives as aqueous composition (B). We have found that when using as aqueous composition (B) a solution in skim milk instead of in water, it was substantially more difficult to prepare a fat continuous product. In various trials no fat continuous product was obtained at all. We believe that this is caused by the surface activity of the milk protein which promotes formation of a water continuous system. We believe that the milk protein contained in dispersion (A) does not have a similar disruptive effect during the present process because it is enclosed, and thereby inactivated, by the plastic butter fat. Thus, when using butter as dispersion (A), a stable low fat spread can be prepared that contains milk protein, which gives the product favorable organoleptic properties, without having to resort to the use of added emulsifiers.

It is to be understood, however, that the present process does not exclude the use of added emulsifier. Whereas butter contains various surface active components that provide sufficient emulsifying action to be able to obtain a stable end product this may not be the case when using another dispersion (A). For example, if margarine containing only a very small amount of emulsifiers or possibly containing essentially no emulsifier at all is used as dispersion (A) then it is desirable to incorporate emulsifier in the present process. Then preferably partial glycerides, in particular monoglycerides, phosphatides or a mixture thereof is employed. The emulsifier can be incorporated by dissolving or dispersing it in the aqueous composition (B) or it can be added separately, for example dissolved or dispersed in a small amount of oil. In certain cases it may be desirable to include such emulsifier even when butter is used as dispersion (A). This may, for example, be the case if the amount of composition (B) to be included is high, for example if the weight ratio of the amounts of composition (B) and dispersion (A) to be used, is higher than 1.

The presence of hydrocolloid in aqueous composition (B) in the present process and in aqueous phase (b) in the present spread is necessary for the physical stability of the product. If no such hydrocolloid is present, the product may nevertheless have a proper fat continuous phase shortly after its preparation, but within a few days storage, we have found, the product destabilizes and releases moisture.

Preferably, the hydrocolloid employed is a gelling agent. Gelling agent is preferably employed in an amount higher than the critical concentration 59° F., i.e. in an amount sufficiently high to cause aqueous composition (B) or aqueous phase (b) to gel if left to stand at 59° F. The precise amount of gelling agent employed is not critical; usually an amount of 1-10 times the critical concentration will be adequate. The optimal concentration will depend to some extent on the gelling agent chosen and on the composition of the other constituents used. The optimal concentration can, however, easily be determined by a few experiments. In practice the optimal amount of hydrocolloid is likely to lie in the range of from 0.5-15% by weight of aqueous composition (B) or aqueous phase (b), in particular in the range of from 1-10% by weight. These ranges not only apply in the case of gelling agents above their critical concentration, but also when using gelling agent below the critical concentration or non-gelling hydrocolloid.

It is preferred however to use as hydrocolloid gelling agent above it critical concentration. It is particularly preferred to use gelling agent such that the gel melting point of aqueous composition (B) or aqueous phase (b) is less than 98.6° F. The most preferred results are obtained when using about 3% by weight of gelatin in aqueous phase (b).

As salt, common cooking salt, sodium chloride can be used in the product of the present invention. Alternatively, other salt such as KCl or NH4Cl, either alone or in combination with NaCl, may be incorporated into the product. The level used can vary according to taste desired. Where it is desired to prepare unsalted low fat butter spread according to the invention, no salt is added to the butter during the buffer making process. If desired, preservatives may be added in its place, to extend the shelf life of the product. In this case, salt may also be omitted from the aqueous gelatin solution.

We believe that the melting characteristics of a gelatin gel resemble in many respects those of the plastic fat contained in spreads.

When using gelling agents that cause the gel to have a gel melting point of less than 98.6° F., preferably 77°-95° F., the gelled aqueous phase droplets will melt and release the flavor when the product is put in the mouth. Because the gel melts, the product as perceived in the mouth becomes thinner. Moreover, depending on the melting heat, the melting may give a cool impression in the mouth. We believe that the replacement of plastic fat in spreads by gelled aqueous droplets that melt below body temperature, in order to produce a low fat spread, therefore, affects the product properties only to a relatively small extent and is easily accepted by the consumer. Particularly advantageous results are obtained with gelatin. We think that this is caused by the similarity of the behavior in the mouth of gelatin gel particles and plastic fat as commonly present in spreads, and we believe this to be related to the peculiar structure of the gelatin gel.

Conventional additions to butter can also be used in the low fat butter spread of this invention. For example, beta carotene or annatto can be added to a small amount of melted butter and dispersed throughout the oil phase to provide a uniform yellow color to the product.

The fat level of the spreads of the present invention can be varied within fairly wide limits, downward from the conventional 80% fat content of butter. A high quality, preferred product has been prepared containing 40% butter fat. Products containing as little as 26% fat have been prepared with the assistance of lecithin and distilled monoglycerides as emulsifiers.

EXAMPLES

The invention will be further illustrated in the following examples:

EXAMPLE 1

A series of 10 lb. batches of low fat butter spread were made following the process outlined below. The composition of each batch is given in Table I. The process will be illustrated with respect to batch 1. The procedure was the same for the remaining batches, with appropriate changes in the level of ingredients.

In preparing batch 1, 2,220 grams of lightly salted creamery butter containing 1.75±0.2% NaCl was tempered to 60° F. An aqueous gelatin solution was separately prepared by combining 2,200 grams of water with 70.3 grams of 225 bloom pork skin type A gelatin and allowing the mixture to stand for about a minute to wet the gelatin. The solution was then warmed to 110° F. and stirred until the gelatin was dissolved. 45.4 grams of sodium chloride, Morton Extra Fine Number 200, was then added with stirring until it was dissolved in the aqueous gelatin solution. The aqueous solution was then allowed to cool to about 85° F.

The spread was prepared in a Stephan vertical cutter mixer, Model No. 2184, type VCM-12, made by the Stephan Food Technology Corp. of West Germany. The tempered butter was added first, followed by the gelatin solution. The mixer was operated at low speed, 1720 rpm, until the butter was broken into small pieces. The mixer was then operated at high speed, 3400 rpm, until the fat continuous dispersion formed. The spread was then removed from the mixer, packed into ½ lb. tubs and allowed to set at 40° F.

In preparing the other batches, the acid and preservatives were mixed with the gelatin solution along with the salt.

TABLE I

| Ingredient | Composition, in percent by weight | | | | |
|---|---|---|---|---|---|
| | 1. | 2. | 3. | 4. | 5. |
| Butter, 1.75 | 48.95 | 48.95 | 48.95 | 48.95 | 48.95 |

TABLE I-continued

| Ingredient | Composition, in percent by weight | | | | |
|---|---|---|---|---|---|
| | 1. | 2. | 3. | 4. | 5. |
| ± .2% NaCl Water | 48.50 | 48.50 | 48.27 | 48.14 | 48.56 |
| Gelatin | 1.55 | 1.55 | 1.55 | 1.55 | 1.55 |
| Salt | 1.00 | 1.00 | 1.00 | 1.00 | 0.58 |
| Na Benzoate | — | — | 0.10 | 0.10 | 0.10 |
| K Sorbate | — | — | 0.13 | 0.13 | 0.13 |
| Lactic Acid | — | to pH 4 | — | 0.13 (pH 4.2) | 0.13 (pH 4.2) |

On organoleptic evaluation, it was found that each spread had a highly acceptable flavor, as well as an excellent flavor release and melting qualities in the mouth, and was almost indistinguishable from creamery butter. In those formulations containing acid, i.e. batch numbers 2, 4, and 5, the presence of the acid was not discernible to the tasters.

Of the above formulations, Batches 1, 3, 4 and 5 were evaluated for their resistance to microbiological spoilage. In conducting these tests, the product was inoculated with mixed cultures containing both bacteria, yeast and molds known to cause spoilage in low fat spreads. Two separate pools of organisms were used to prepare inoculums, one containing a mixture of gram positive bacteria, yeasts and molds, while a second contained gram negative organisms.

The inoculum was added to the aqueous gelatin phase during the preparation of the low fat butter spread. Each batch was separated into four sterile 16 oz. jars, two of which were incubated at 39° F. and two at 50° F. One jar was left opened and the other closed.

The products were examined weekly for six weeks and bi-weekly thereafter. Tests performed at each assay point included standard plate counts and specific tests for yeast/mold, coliform, fecal strep, and *Staphylococcus aureus*. The product was determined to be spoiled where an increase of any inoculated species was found to be two or more log units.

Formulation 1 showed evidence of spoilage after three days; Formulation 3 spoiled after four weeks; Formulation 4, under the same storage conditions, showed no evidence of spoiling after 24 weeks; and Formulation 5 shows no evidence of spoilage after 10 weeks.

EXAMPLE 2

A series of 2 lb. batches of low fat butter spreads was made following the process outlined below. In each batch, the gelatin was dissolved in milk at 110° F., and the salt or acid then added and dissolved, where required. All of the ingredients called for in the formulations given in Table II below, in each instance, were added to a Cuisinart food processor, Model No. DLC-7 PRO and mixed at high speed until a water in oil emulsion was formed.

TABLE II

| Ingredient | Composition, in percent by weight | | | | |
|---|---|---|---|---|---|
| | 6. | 7. | 8. | 9. | 10. |
| Butter, 1.75 ± .2% NaCl | 49.60 | 49.60 | 49.60 | 49.60 | 49.60 |
| Water | — | — | — | — | — |
| Gelatin | 0.80 | 0.80 | 1.55 | 1.55 | 1.80 |
| Salt | — | — | — | — | 0.45 |
| Lactic Acid | — | to pH 4 | — | to pH 4 | — |
| Skim Milk | 49.60 | 49.60 | 48.85 | 48.85 | — |
| Whole Milk | — | — | — | — | 46.00 |

A stable fat continuous dispersion was formed in each batch, except for batch 9, in which a stable fat continuous dispersion could not be formed.

Batches 6–8 and 10 formed stable water in oil emulsions which were placed into ¼ lb. tubs and allowed to set at 40° F. Organoleptic evaluation of these batches disclosed that batch 7 had a very sour, unpleasant taste. Batches 6, 8 and 10 gave good flavored products.

EXAMPLE 3

A product having the formulation of batch number 5, Table I, was made on a pilot plant scale. A 20 lb. batch was made using lightly salted fresh creamery butter having 1.75±0.2% NaCl tempered to 60° F. A gelatin solution was made following the procedure set forth in Example 1.

The butter was introduced by means of a funnel into a Waukesha pump, size 3, running at full speed, 1760 rpm, and feeding a static mixer. The static mixer was a Koch static mixing unit manufactured by the Koch Engineering Company of Wichita, Kansas. The mixture of materials was passed through the static mixer six times.

After mixing in the static mixer, the materials were then fed to a Disho dispersing and homogenizing plant, Type A 60/10, Koruma - Maschinenbau, P. Hauser KG-D-7844, Nevenburg, West Germany. After two passes through the Disho machine, the material was placed in a Groen kettle, Model No. TDC/TA/2-20, a scraped surface cooler. After approximately two minutes of cooling using 40° F. water in the jacket, a fat continuous dispersion was formed. The product was then placed in ¼ lb. tubs, and allowed to set at 40° F.

Upon tasting it was found to have a high level of acceptable fresh butter taste with no discernible sour taste.

EXAMPLE 4

A suitable continuous plant-scale process in accordance with this invention was carried out in a dairy equipped to prepare butter from sweet cream using a continuous churn. Sweet cream having a fat content of 40% was pasteurized, cooled to 52° F., and fed into the continuous churn, a Paasch and Silkeborg continuous butter making machine, Model No. HCT 1A, operated at 5000 lb./hour. The butter was lightly salted by adding 1.75% NaCl, basis butter weight in the working section of the churn. The churn contained a continuous centrifugal separator which removed most of the buttermilk from the cream. After churning, the butter was discharged to one head of a Bran-Lubbe proportioning pump, Type N-C32KA32.

A gelatin solution was made up by dissolving 225 bloom pork skin type A gelatin in water at 110° F. to provide 2500 lbs. of a 3% solution. Sodium chloride of the type used in Example 1, together with sodium benzoate, potassium sorbate and lactic acid, all in sufficient quantities to make a spread having the composition of Batch 4 of Table I, were added to the gelatin solution. The gelatin solution was then cooled to 80° F. and pumped to a second head of the proportioning pump.

From the proportioning pump, the butter and gelatin solution mixture was directed through a Ross Static Mixer, Type LPD, 4" in diameter and 36" in length, which supplies low shear to the composition. Following the pass through the static mixer, the mixture passed through a Mince Master, Model A, supplied by Griffith Laboratory, Chicago and then through a Disho machine, In line II/140. Each of these units impart high shear to the mixture, causing formation of a fat continuous dispersion. After the Disho, the material passes directly to a Votator A unit, 6" in diameter×24" long. The product had an exit product temperature of 65° F., and was packed as ¼ lb. prints.

On organoleptic evaluation, the product was found to have highly acceptable flavor, nearly indistinguishable from lightly salted creamery butter, and to have the flavor release and eating qualities of butter in the mouth.

Evaluation of the product of this example for resistance to microbiological spoilage established that there was no unacceptable change in flavor and no microbiological spoilage after 20 weeks of storage at 40° F.

EXAMPLE 5

A low fat butter spread containing emulsifiers was made following the process given in Example 4 above. The composition of the product was, by percent by weight, 48.5% lightly salted fresh creamery butter, 46.59% water, 1.55% gelatin, 1.00% salt, 0.10% Na benzoate, 0.13% potassium sorbate, 0.13% lactic acid, 0.3% Myverol 1892, a mixture of mono and diglycerides, and 0.2% lecithin, Centrol ® Crude Natural Lecithin (Central Soya). The Myverol and lecithin were added by blending them with 1.5% additional butter heated to 140° F. This additional blend was metered into the batch through a third head of the Bran-Lubbe proportioning pump.

The product on evaluation was found to have a highly acceptable flavor.

EXAMPLE 6

A whipped low fat butter spread was prepared by preparing the product described in Example 5 above, and by injecting nitrogen into the product stream just prior to the Votator "A" unit. Sufficient nitrogen was injected to provide a product having a specific gravity of 0.8 as compared with a normal product specific gravity of about 0.95.

The product had excellent flavor and good eating qualities and mouth feel, similar to whipped butter. The amount of nitrogen can be increased to provide a product having a specific gravity of 0.6 or lower, if desired.

EXAMPLE 7

Several of the products made according to this invention were tested to determine the presence therein of two distinct separate aqueous phases. In this work, three low fat butter spreads were examined using a temperature programmed de-emulsification method and measuring the effect on the pH of the liberated water phase.

Sample 1 was a product made following the process outlined in Example 3, having the composition of Batch 5 in Table I. It was about three days old when evaluated. Sample 2 was made according to the process of Example 1, and had the composition of Batch 4 of Table I. This product was about one week old when evaluated. Sample 3 was made generally following the process of Example 4, except that different but equivalent processing equipment was used to provide the shear. This sample was four months old.

The method used was as follows:

Each sample of low fat butter spread was mixed with distilled water in the proportion of 1:100 in a temperature controlled cell at 25° C. The pH was registered during a heating program which raised the temperature of the sample from 25° C. to 40° C. at the rate of 1° C. per minute. The results obtained are summarized in FIG. 1 attached hereto.

Figure 1:
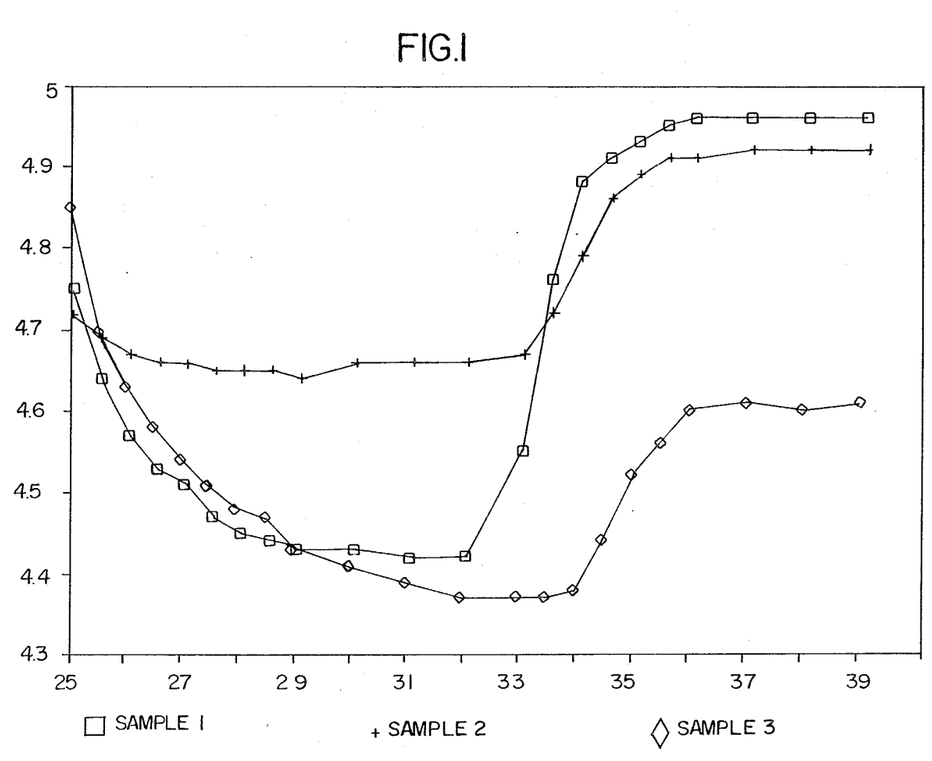

It will be noted that up to about 30° C., only the added aqueous gelatin solution phase having a low pH separates from the sample. In the temperature range of 32° C. to about 36° C., the original butter serum phase comes free, and the pH increases sharply.

While there are some quantitative differences among the three samples, they can be explained by differences in composition, processing variables and age of sample. It is clear that the products of this invention have two separate aqueous phases.

We claim:

1. Process for preparing an edible spread having a continuous fat phase including the steps of
   (i) forming an admixture of
      an edible plastic dispersion (A) comprising a continuous fat phase and a discontinuous aqueous phase, which aqueous phase has a pH higher than 4.7 and contains protein selected from the group consisting of milk protein, soy protein, and mixtures thereof, and
      an edible aqueous composition (B) having a pH at or below 4.7, and containing hydrocolloid, which aqueous composition is substantially free from milk protein and soy protein,
   (ii) forming a product having a continuous fat phase by subjecting the admixture to a working treatment at a temperature at which the fat phase of plastic dispersion (A) remains plastic, the product having a fat content, by weight, of 26% to 68% and
   (iii) packing the product.

2. Process according to claim 1 wherein the hydrocolloid comprises gelling agent.

3. Process according to claim 2 wherein the aqueous composition (B) comprises gelling agent in a concentration above the critical concentration at 59° F.

4. Process according to claim 3 wherein the gel melting point of aqueous composition (B) is less than 98.6° F.

5. Process according to claim 2 wherein the gelling agent comprises gelatin.

6. Process according to claim 1 wherein the pH of aqueous composition (B) is from 2.5 to 4.7.

7. Process according to claim 6 wherein the pH of aqueous composition (B) is about 4.

8. Process according to claim 1 wherein aqueous composition (B) contains preservative.

9. Process according to claim 8 wherein the preservative is selected from the group consisting of benzoate, sorbate, and mixtures thereof.

10. Process according to claim 7, wherein aqueous composition (B) consists essentially of water, acid, gelatin, a benzoate, a sorbate and salt.

11. Process according to claim 1 wherein the aqueous phase of plastic dispersion (A) contains salt.

12. Process according to claim 1 wherein the plastic dispersion (A) contains from 40 to 95% by weight of fat.

13. Process according to claim 12 wherein the plastic dispersion (A) contains from 70 to 90% by weight of fat.

14. Process according to claim 13 wherein plastic dispersion (A) is margarine or butter.

15. Process according to claim 1 wherein the volume weighted mean diameter of the aqueous phase droplets of plastic dispersion (A) is less than 15 microns.

16. Process according to claim 15 wherein the volume weighted mean diameter of the aqueous phase droplets of plastic dispersion (A) is 0.1 to 10 microns.

17. Process according to claim 16 wherein the volume weighted mean diameter of the aqueous phase droplets of plastic dispersion (A) is 1 to 5 microns.

18. Process according to claim 1 wherein step (i) comprises forming an admixture that constitutes a dispersion having a continuous aqueous phase by combining streams of plastic dispersion (A) and aqueous composition (B) and passing the combined streams through a low shear mixer, and step (ii) comprises forming a product having a continuous fat phase by causing the admixture to form a fat continuous dispersion by subjecting it to a working treatment.

19. Process according to claim 18 wherein step (ii) comprises subjecting the admixture to a working treatment to cause it to form a fat continuous dispersion by passing it through a high shear mixer.

20. Process according to claim 1 wherein step (i) comprises forming an admixture having a temperature of less than 86° F., and wherein steps (ii) and (iii) the temperature is maintained below 86° F.

21. Process according to claim 20 wherein in step (ii) the working treatment includes passage through a mixer provided with cooling means.

22. Process according to claim 20 wherein the mixer provided with cooling means is a scraped surface heat exchanger.

23. Process according to claim 21 wherein step (ii) comprises forming a product having a temperature between 41° F. and 68° F.

24. Process according to claim 1 wherein step (ii) comprises forming a product having a continuous fat phase and containing dispersed aqueous droplets of which the volume weighed mean diameter is less than 40 microns.

25. Process according to claim 24 wherein the volume weighed mean diameter of the dispersed aqueous droplets of the product is 1-30 microns.

26. Process according to claim 1 wherein step (i) comprises forming an admixture of 30-80% by weight of edible plastic dispersion (A) and 70-20% by weight of aqueous composition (B).

27. Process according to claim 26 wherein step (i) comprises forming an admixture of 40-60% by weight of edible plastic dispersion (A) and 60-40% by weight of aqueous composition (B).

28. Edible spread having a fat content, by weight, of 26% to 65% and having a continuous fat phase and containing
a discontinuous aqueous phase (a) having a pH higher than 4.7 and containing protein selected from the group consisting of milk protein, soy protein, and mixtures thereof, and
a discontinuous aqueous phase (b) having a pH at or below 4.7 and containing hydrocolloid, which aqueous phase (b) is substantially free from milk protein and soy protein.

29. Spread according to claim 28 wherein the hydrocolloid comprises gelling agent.

30. Spread according to claim 29, wherein aqueous phase (b) is gelled.

31. Spread according to claim 30, wherein the gel melting point of aqueous phase (b) is less than 98.6° F.

32. Spread according to claim 29 wherein the gelling agent comprises gelatin.

33. Spread according to claim 28 wherein the pH of aqueous phase (b) is from 2.5 to 4.7.

34. Spread according to claim 33 wherein the pH of aqueous phase (b) is about 4.

35. Spread according to claim 28 wherein aqueous contains preservative.

36. Spread according to claim 35 wherein the preservative is selected from the group consisting of benzoates, sorbates, and mixtures thereof.

37. Spread according to claim 34 wherein aqueous phase (b) consists essentially of water, acid, gelatin, a benzoate, a sorbate and salt.

38. Spread according to claim 28 wherein aqueous phase (a) contains salt.

39. Spread according to claim 28 comprising 20-75% by weight of fat.

40. Spread according to claim 39 comprising 30-65% by weight of fat.

41. Spread according to claim 28 comprising fat that consists essentially of butterfat.

42. Spread according to claim 28 wherein aqueous phase (a) consists of droplets of which the volume weighed mean diameter is less than 15 microns.

43. Spread according to claim 42 wherein the volume weighed mean diameter of the droplets of aqueous phase (a) is 0.1 to 10 microns.

44. Spread according to claim 43 wherein the volume weighed mean diameter of the droplets of aqueous phase (a) is to 5 microns.

45. Spread according to claim 28 wherein aqueous phase (b) consists of droplets of which the volume weighed mean diameter is less than 40 microns.

46. Spread according to claim 45 wherein the volume weighed mean diameter of the droplets of aqueous phase (b) is 1-30 microns.

47. A method for preparing a low fat butter spread which comprises:
(a) providing a butter of pumpable plastic consistency, the butter comprising a continuous phase of butter fat and having a discontinuous aqueous butter serum phase having a pH above 4.7;
(b) combining a stream of the butter with a stream of aeons gelatin solution having a pH at or below 4.7 to provide a product stream of butter and gelatin solution, the product stream having a fat content, by weight, of 26% to 65%;
(c) forming a stable dispersion of the gelatin solution as droplets in a continuous phase of the butter at of the butter, without substantial change to the discontinuous aqueous butter serum phase; and
(d) allowing the dispersion to set to form a low fat butter spread.

48. The method of claim 47, wherein the gelatin solution in step (c) is dispersed as droplets having a volume weighted mean diameter of 1.5 to 40 microns uniformly throughout the continuous phase of butter fat.

49. The method of claim 47, wherein the gelatin solution comprises gelatin in a concentration above the critical concentration at 59° F., has a pH within the range of 2.5 to 4.7 and is free of milk protein.

50. The method of claim 47, wherein the butter has a temperature in the range of 45°-75° F., and the aqueous gelatin solution has a temperature in the range of 60° F. to 120° F.

51. A method for preparing a low fat butter spread which comprises:
  (a) preparing butter by churning to form a stream of butter of pumpable plastic consistency;
  (b) combining the stream of butter with a stream of aqueous gelatin solution to provide a product stream having butter and gelatin solution, the product stream having a fat content, by weight, of 26% to 65%;
  (c) passing the product stream through a mixing device to provide a gross mixing thereof;
  (d) passing the product stream through a high shear mixing device to form a dispersion of gelatin solution droplets throughout a continuous butter phase; and
  (e) allowing the dispersion to cool and set to form a low fat butter spread.

52. The method of claim 51 wherein the aqueous gelatin solution has a pH of about 4, has a gelatin concentration above the critical concentration at 59° F., and is substantially free of milk protein.

53. The method of claim 52, wherein the aqueous gelatin solution has a low buffer capacity.

54. The method of claim 51, wherein the aqueous gelatin solution has from 0.25% to 4.25% by weight of gelatin, has a low buffer capacity, and has a pH in the range of 2.5 to 4.7.

55. The process of claim 54, wherein the gelatin solution has a pH of about 4.0.

56. A low fat butter spread comprising, by weight, 26% to 65% butter fat as its continuous phase, droplets of aqueous butter serum having a pH above 4.7 as a discontinuous phase, and droplets of aqueous gelatin solution having a pH of from 2.5 to 4.7 dispersed therein, the aqueous gelatin solution being free of milk protein.

57. The low fat butter spread of claim 56, wherein the gelatin solution contains gelatin at a concentration above the critical concentration at 59° F.

58. The spread of claim 56, wherein the first discontinuous phase droplets of butter serum have a volume weighted mean diameter of up to about 5 microns, and the droplets of gelatin solution have a volume weighted mean diameter in the range of 1.5 to 40 microns.

59. A low fat butter spread comprising, by weight, 26% to 65% butter fat as its continuous phase, droplets of aqueous butter serum having a pH above 4 7 as a discontinuous phase, and droplets of aqueous gelatin solution having a pH of from 2.5 to 4.7 dispersed therein, the gelatin solution having a low buffer capacity.

60. The low fat butter spread of claim 56, wherein the gelatin solution consists of gelatin, water, lactic acid, sodium benzoate and potassium sorbate.

61. The low fat butter spread of claim 56, wherein the pH of the gelatin solution is about pH 4.0.

* * * * *

UNITED STATES PATENT AND TRADEMARK OFFICE
CERTIFICATE OF CORRECTION

PATENT NO. : 4,882,187

DATED : November 21, 1989

INVENTOR(S) : Izzo, et al.

It is certified that error appears in the above-identified patent and that said Letters Patent is hereby corrected as shown below:

```
Col. 5, line 20, "describes" should read --described--;
Col. 6, line 9, "Structurally, structurally, should read
--Structurally--;
Col. 6, line 52, "water-continuousphase" should read
--water-continuous phase--;
Col. 11, line 44, delete "as";
Col. 11, line 45, "it" should read --its--;
Col. 16, line 40, "68%" should read --65%--;
Col. 17, line 27, "wherein" should read --wherein in--;
Col. 17, line 41, "weighed" should read -weighted--;
Col. 17, line 44, "weighed" should read -weighted--;
Col. 18, line  9, after "aqueous" insert --phase (b)--;
Col. 18, line 27, "weighed" should read --weighted--;
```

UNITED STATES PATENT AND TRADEMARK OFFICE
CERTIFICATE OF CORRECTION

PATENT NO. : 4,882,187

DATED : November 21, 1989

INVENTOR(S) : Izzo, et al.

It is certified that error appears in the above-identified patent and that said Letters Patent is hereby corrected as shown below:

```
Col. 18, line 29, "weighed" should read --weighted--
Col. 18, line 32, "weighed" should read --weighted--
Col. 18, line 33, "to 5" should read --1 to 5--;
Col. 18, line 36, "weighed" should read --weighted--;
Col. 18, line 38, "weighed" should read --weighted--;
Col. 18, line 47, "aeons" should read --aqueous--;
Col. 18, line 52, "butter at" should read --butter fat--;
Col. 20, line 20, "4 7" should read --4.7--.
```

Signed and Sealed this

Nineteenth Day of March, 1991

*Attest:*

HARRY F. MANBECK, JR.

*Attesting Officer*  *Commissioner of Patents and Trademarks*